United States Patent Office 3,087,940
Patented Apr. 30, 1963

3,087,940
19-METHYL PREGNENE DERIVATIVES
Martin Rubin, Silver Spring, Md., assignor, by mesne assignments, to Advance Growth Capital Corporation, Chicago, Ill., a corporation of Illinois
No Drawing. Filed Feb. 3, 1959, Ser. No. 790,792
1 Claim. (Cl. 260—397.4)

This invention relates to a new class of steroids characterized by a 19-hydroxy or keto, 19-methyl structure. More particularly this invention relates to the conversion of the isopregnanes disclosed in applicant's copending application, S.N. 790,790 filed concurrently herewith into steroids having the 3-keto-4-ene grouping in the "A" ring of the cyclopentanophenanthrene nucleus. The conversion proceeds according to the following formula sequence.

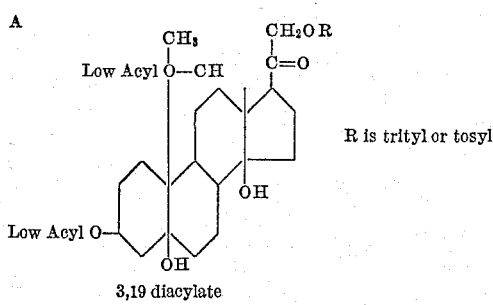

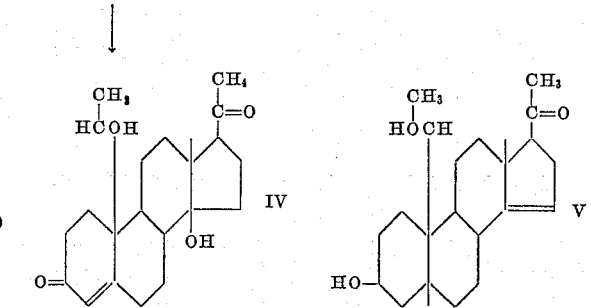

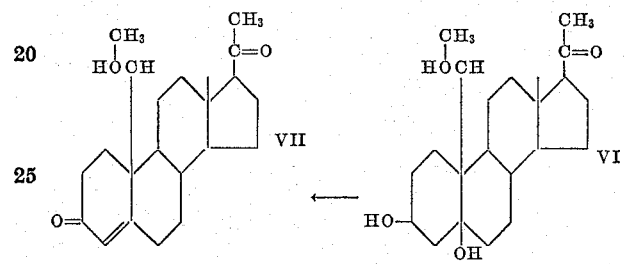

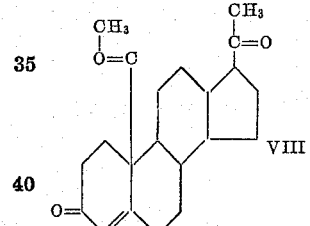

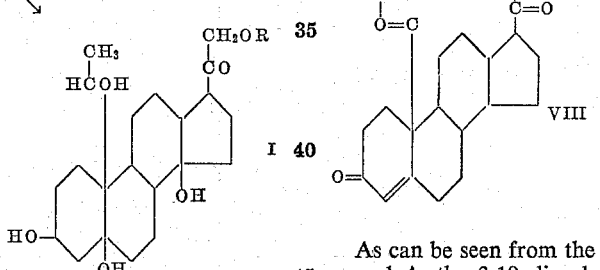

As can be seen from the formula sequence above, compound A, the 3,19 diacylate disclosed in applicant's copending application S.N. 790,790 forms the starting material for the instant conversion to the desired 3-keto-4-ene grouping. As a first step, the acylate is hydrolyzed to the 21-tritoxy 3,5,14,19 tetrahydroxy 20-keto, 19-methyl-14 isopregnane or its 21 tosyl analogue. Thereafter reaction with N-bromoacetamide converts the steroid to the corresponding 3-keto-4-ene structure of compound II. For workers in the art who are interested in steroids having the pharmacological properties of cortisone, hydrocortisone and the like, compound II offers particular interest as an intermediate for further research because of its striking similarity to the structure of desoxycorticosterone type steroids in the 17 side chains, the 3-keto-4-ene structure with the juxtaposition of a 19-hydroxy structure.

Alternatively as shown by the sequence to compound III, a progesterone-like side chain may be achieved in the 17-substituent by hydrogenation prior to selective oxidation of the 3,5 hydroxy groups to the 3-keto-4-ene structure of compound IV.

To directly attain a compound having the same pharmaceutical activity as progesterone, the 14-hydroxy substituent should be removed prior to oxidation of the 3,5 hydroxy substituents. As shown on the formula sequence, compound III is contacted with alcoholic HCl for dehydration at $C_{14}$, then hydrogen to reduce the resulting 14—15 double bond. Thereafter oxidation with N-bromoacetamide converts the 3,5 hydroxy steroid to the 3-keto-4-ene structure, followed by oxidation of the 19-hydroxy to the product 19-keto compound, which is progestationally active. In passing, it should be noted that compound IV also has progestational activity.

The following examples further illustrate the practice of the instant invention.

EXAMPLE I

*21-Tritoxy-3,5,14,19-Tetroxy-20-Keto, 19-Methyl-14-Isopregnane*

To a solution of 65 mg. of the 3,19 diacetate of the above compound prepared by the method of copending application S.N.790,790, there was added 15 mg. of KOH in 5 cc. of 95% ethanol. After 24 hours at room temperature the alkaline solution was acidified with glacial acetic acid, and concentrated to a small volume. The concentrate was dissolved in 50 ml. chloroform, washed with 25 ml. of N/10 sodium bicarbonate and water. After drying over sodium sulfate and evaporation of the solvent, there was obtained 72 mg. of the tetrahydroxy product.

EXAMPLE II

To 300 mg. of 21-tosyloxy-3,5,14,19-tetroxy-20-keto, 19-methyl-14-isopregnane-3,19 diacetate in 100 ml. of 75% ethanol was added 200 mg. of potassium carbonate. After standing at room temperature overnight the solution was neutralized with acetic acid, concentrated in vacuo and the residue extracted with chloroform. The chloroform extracts were washed with water, bicarbonate, water; dried over calcium chloride; filtered and concentrated. The residue was chromatographed over neutral alumina. The fraction eluted with acetone-methanol provided the 3,5,14,19-tetrahydroxy-21-tosyloxy derivative.

*Analysis.*—Calcd. for $C_{29}H_{42}O_8S$; C, 61.9; H, 7.92. Found: C, 62.4; H, 8.30.

EXAMPLE III

*21-Tritoxy-14,19-Dioxy-3,20-Diketo-14,19-Methyl-4-Isopregnene*

75 mg. of the product of Example I in 5 cc. of tertiary butyl alcohol was treated with 2 ml. of water and 34 mg. of N-bromoacetamide. After standing at room temperature overnight, 200 mg. of sodium bisulfite in 5 ml. of water was added, followed by extraction with two 50 ml. portions of chloroform. The combined extracts were washed wtih water, dried over anhydrous sodium sulfate and concentrated. Removal of the chloroform yielded 70 mg. of residue. Solution of the residue in 5 ml. of ethanol was followed by treatment with 10 ml. of 1 N-hydrochloric acid. After standing a short time at room temperature the mixture was extracted with two 25 ml. portions of chloroform, washed twice with 10 ml. portions of N/10 sodium bicarbonate and once with water. After drying and concentration of the solvent, 54 mg. of product oil was obtained, showing the characteristic absorption maximum in ethanol at 240 mu typical of the 3-keto-4-ene system. Elementary analysis was in accord with the theory for the 19-homo-3-one-4-ene compound.

EXAMPLE IV

*Conversion of 3,5,14,19 - Tetrahydroxy - 21 - Tosyloxy-20 - Keto - 19 - Methyl - 14 - Iisopregnane to 3,5,14, 19 - Tetrahydroxy - 19 - Methyl - 14 - Isopregnan - 20-One*

100 mg. of the tosyl derivative and 50 mg. of sodium iodide were refluxed in 30 ml. of acetone for 15 minutes. The acetone was removed by distillation in vacuo, the residue treated with water and extracted with ether. The ether extracts were washed with bisulfite solution, water, and concentrated. The residue was dissolved in 10 ml. of acetic acid, treated with a pinch of zinc dust, and warmed to 40° C. for 30 minutes. The solution was concentrated on a water bath in vacuo, extracted with ether, the extracts washed with bicarbonate solution, water; dried over magnesium sulfate, filtered and concentrated. The oily residue was crystallized from methanol.

*Analysis.*—Calcd. for $C_{22}H_{36}O_5$: C, 69.5, H, 9.48. Found: C, 69.9; H, 9.72.

EXAMPLE V 75 mg. of 3,5,14,19 - tetrahydroxy - 19 - methyl - 14-isoprognan-20-one (Formula III) was treated with 2 ml. of water and 34 mg. of N-bromoacetamide following the procedure of Example III. The oily product (53 mg.) showed the characteristic ultraviolet absorption at 241 mu in ethanol of the 3-keto-4-ene system.

*Analysis.*—Calcd. for $C_{22}H_{32}O_4$: C, 73.2; H, 8.94. Found: C, 73.4; H, 9.06.

EXAMPLE VI

*3,5,19-Trihydroxy-19-Methyl-14-Pregnen-20-One*

1.62 grams of the product of Example IV (Formula III) was dissolved in 200 ml. of 0.1 N solution of hydrogen chloride in absolute alcohol. The resulting solution was kept at room temperature for half hour and was then concentrated to dryness in vacuo. The residue was taken up in ethyl acetate, the extract washed with dilute cold sodium carbonate solution, water and dried over magnesium sulfate. After filtration and concentration the residue was taken up in benzene and chromatographed over Brockman alumina. The acetone-methanol elute yielded 0.72 g. of microcrystalline product which gave intense coloration with tetranitromethane in solution, indicative of the unsaturated compound.

*Analysis.*—Calcd. for $C_{22}H_{34}O_4$: C, 73.0; H, 9.40. Found: C, 73.2; H, 9.46.

EXAMPLE VII

*3,5,19-Trihydroxy-19-Methyl-Pregnan-20-One*

1.1 g. of the product of Example VI (Formula V) in 200 glacial acetic acid was reduced with hydrogen in the presence of 0.4 g. of Adams platinum oxide catalyst at room temperature and two atmospheres. When the uptake of hydrogen was complete the catalyst was filtered, the filtrate concentrated to dryness in vacuo, extracted with ethyl acetate, the extract washed with cold dilute sodium carbonate solution, water, dried over magnesium sulfate, filtered and concentrated. The residue crystallized from methanol on cooling. The crystalline product gave a negative test to tetranitromethane solution, indicative of the saturation of the double bond.

*Analysis.*—Calcd. for $C_{22}H_{36}O_4$: C, 72.6; H, 9.9. Found: C, 72.4; H, 10.2.

EXAMPLE VIII

*19-Hydroxy-19-Methyl-4-Pregnene-3,20-Dione*

A solution of the product of Example VII (Formula VI) was treated according to the procedure of Example V to produce the above-named compound.

*Analysis.*—Calcd. for $C_{22}H_{32}O_3$: C, 72.8; H, 9.3. Found: C, 72.9; H, 9.5.

EXAMPLE IX

*19-Methyl-4-Pregnene-3,19,20-Trione*

A solution of 150 mg. of the product of Example VIII (Formula VII) in 50 cc. of acetic acid was treated with 50 mg. CrO₃ in acetic acid and water at 10–15° C. After one and a half hours the excess chromic acid was destroyed by addition of 1 ml. of methanol, the solution concentrated to a small volume in vacuo, diluted by water, extracted with ether, the ether extracts washed with water, bicarbonate, water, dried over anhydrous MgSO₄, filtered, concentrated. The gummy residue crystallized on addition of a drop of acetone-petroleum ether (equal parts).

*Analysis.*—Calcd. for $C_{22}H_{30}O_3$: C, 76.9; H, 10.7. Found: C, 77.1; H, 10.9.

I claim:

A 3β OH, 5β OH steroid having the formula

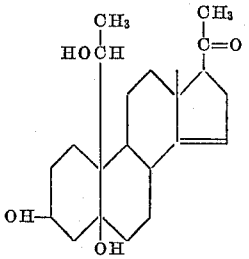

References Cited in the file of this patent

UNITED STATES PATENTS 2,778,776     Wettstein et al. _____ Jan. 22, 1957

OTHER REFERENCES

Helv. Chim. Acta., volume 23 (1940), page 400.